United States Patent
Rao et al.

(10) Patent No.: US 7,837,782 B2
(45) Date of Patent: Nov. 23, 2010

(54) YELLOW INORGANIC PIGMENTS AND PROCESS FOR PREPARING SAME

(75) Inventors: Padala Prabhakar Rao, Trivandrum (IN); Mundlapudi Lakshmipathi Reddy, Trivandrum (IN)

(73) Assignee: Council of Scientific and Industrial Research, Kerala (IN)

( * ) Notice: Subject to any disclaimer, the term of this patent is extended or adjusted under 35 U.S.C. 154(b) by 0 days.

(21) Appl. No.: 12/036,848

(22) Filed: Feb. 25, 2008

(65) Prior Publication Data

US 2008/0247933 A1    Oct. 9, 2008

(30) Foreign Application Priority Data

Feb. 26, 2007    (IN)    ............ 397/DEL/2007

(51) Int. Cl.
*C08K 3/00*    (2006.01)
*C04B 14/00*   (2006.01)
*C01F 17/00*   (2006.01)

(52) U.S. Cl. ............ 106/451; 106/479; 423/263; 252/521.1

(58) Field of Classification Search .......... 423/263; 252/521.1; 106/451, 461, 479
See application file for complete search history.

(56) References Cited

U.S. PATENT DOCUMENTS 3,899,347 A * 8/1975 de Ahna et al. ............ 106/451
5,275,649 A * 1/1994 Linke et al. ............... 106/451

OTHER PUBLICATIONS

J.A. Alonso, F. Rivillas, M.J. Martinez-Lope, V. Pomjakushin. Preparation and structural study from neutron diffraction data of R2MoO6 (R=Dy, Ho, Er, Tm, Yb, Y), J. Solid State Chem., 177 (2004) 2470-2476.*

P.S. Berdonosov, D.O. Charkin, K.S. Knight, K.E. Johnston, R.J. Goff, V.A. Dolgikh, P. Lightfoot. Phase relations and crystal structures in the systems (Bi,Ln)2WO6 and (Bi,Ln)2MoO6 (Ln = lanthanide), J. Solid State Chem., 179 (2006) 3437-3444.*

G. George, G. George, P.P. Rao, M.L. Reddy. Synthesis and Characterization of Environmentally Benign Nontoxic Pigments: RE2Mo2O9 (Re = La or Pr), Chem. Lett., vol. 34, No. 12 (2005) 1702-1703.*

F. De Smet, P. Ruiz, B. Delmon, M. Devillers. Evaluation of the role played by praseodymium molybdates in Pr6O11-MoO3 catalysts for the selective oxidation of isobutene to methacrolein, Appl. Catal. A: General, 172 (1998) 333-349.*

P. Gall and P. Gougeon. The pyrochlore-type molybdate Pr1.37Ca0.63Mo2O7, Acta Cryst. 2008, E64, i42.*

T. Yamazaki, T. Shimazaki, T. Hashizume, K. Terayama. Investigation of double oxides in the system of Pr-Mo-O, J. Mater. Sci. Lett., 2002, 21, 29-31.*

T. Shimazaki, T. Yamazaki, K. Terayama. Phase relations in the Pr-Mn-O system at 1000 oC, J. Mater. Sci. Lett., 2000, 19, 2029-2031.*

Shin-Etsu Chemical Co., Product Information, 2005, 1-2.*

* cited by examiner

*Primary Examiner*—Jennifer K Michener
*Assistant Examiner*—Carlos Barcena
(74) *Attorney, Agent, or Firm*—Edwards Angell Palmer & Dodge LLP; Barry Kramer; Gabriel J. McCool

(57) ABSTRACT

The present invention provides yellow inorganic pigments comprising praseodymium, oxides of transition metals selected from molybdenum, titanium, zirconium and combinations thereof, essentially molybdenum, optionally with alkaline earth metal (A) and the said yellow inorganic pigment has a general formula $APr_2MoTm_xO_{6+\eta}$ or $Pr_2MoTm_xO_{6+\eta}$ (Tm=Ti or Zr, x=0 or 1, and wherein $\eta$ has a value commensurate with the value of x and sufficient to satisfy the valencies of the formula). High purity chemicals such as $MgCO_3$, $CaCO_3$, $SrCO_3$, $BaCO_3$, $TiO_2$, $ZrO_2$, $(NH_4)_6Mo_7O_{24} \cdot 4H_2O$ and $Pr_6O_{11}$ are weighted in the stoichiometric ratio, ball milled and calcined in the range 900°-1200° C. for 3-12 hrs in air.

20 Claims, 6 Drawing Sheets

US 7,837,782 B2

YELLOW INORGANIC PIGMENTS AND PROCESS FOR PREPARING SAME

CROSS-REFERENCE TO RELATED APPLICATIONS

This application claims priority to Indian Patent Application No. 397/DEL/2007, filed on Feb. 26, 2007, the entire contents of which are incorporated herein by reference.

All documents cited or referenced herein, together with any manufacturer's instructions, descriptions, product specifications, and product sheets for any products mentioned herein, are hereby incorporated by reference, and may be employed in the practice of the invention.

BACKGROUND OF THE INVENTION

1. Field of Invention

The present invention relates to yellow inorganic pigments comprising oxides of alkaline earth, praseodymium, and transition metals. More particularly, the present invention relates to yellow inorganic pigments having the general formula: $APr_2MoTm_xO_{6+\eta}$ or $Pr_2MoTm_xO_{6+\eta}$ (Tm=Ti or Zr and x=0 or 1) wherein A is selected from one or more alkaline earth metals [A=for example, Mg, Ca, Sr or Ba, or combinations thereof], and wherein $\eta$ has a value commensurate with the value of x and sufficient to satisfy the valencies of the formula. The present invention also relates to a process for the preparation of yellow inorganic pigments of general formula $APr_2MoTm_xO_{6+\eta}$ or $Pr_2MoTm_xO_{6+\eta}$ (Tm=Ti or Zr and x=0 or 1) wherein A is selected from one or more alkaline earth metals [A=for example, Mg, Ca, Sr or Ba], and wherein has a value commensurate with the value of x and sufficient to satisfy the valencies of the formula. The yellow inorganic pigment is well suited for coloring applications of a wide variety of substrates for example paints, varnishes, plastics, ceramics etc.

2. Background

Inorganic pigments are widely used in various applications such as paints, inks, plastics, rubbers, ceramics, enamels, and glasses. Unfortunately, the majority of the colorants currently employed for the above applications contain toxic metals (e.g., Cr, Co, Cd, Hg, Pb, etc.) that can adversely affect the environment and human health if critical levels are exceeded (further reference may be made to "High Performance Pigments," ed. by H. M. Smith, Wiley-VCH, Weinheim, 2002, incorporated herein by reference). Thus, a serious need arises to search for environmentally friendly colorants for the replacement of toxic inorganic pigments, for use on industrial scale and which otherwise avoid the above disadvantages and drawbacks to date characterizing the state of this art.

Yellow is a particularly important color in the ceramic pigment field and the consumption of the yellow pigment exceeds that of any other colored pigments. There are three important yellow pigment families: tin vanadia yellows (further reference may be made to DCMA 11-22-4), praseodymium zircon (further reference may be made to DCMA 14-43-4), zircon vanadia yellow (further reference may be made to DCMA 1-01-4). It will be appreciated that reference to a particular DCMA number can be found in the art, for example, in DCMA, "Classification and Chemical Description of the Complex Inorganic Color Pigments," Third Edition, 1991, published by the Dry Color Manufacturers' Association, USA, which is incorporated herein by reference. Other yellow ceramic pigments commonly used such as $Pb_2Sb_2O_7$, $PbCrO_4$, CdS are now being expelled from the market because of their toxicity (further reference may be made to J. A. Badenes, M. Llusar, M. A. Tena, J. Calbo, G. Monros, J. Eur. Ceram. Soc. 2002, 22, 1981-1990, which is incorporated herein by reference).

The use of praseodymium doped zirconium silicate crystals as a pigment for use in ceramic glazes was disclosed by C. A. Seabright in U.S. Pat. No. 2,992,123, July 1961. Since that time, there have been numerous patents issued for praseodymium doped zircons for ceramic applications and now it is manufactured worldwide. Stable pigment particles comprising praseodymium doped zirconium silicate particles, at least about 50 percent by volume of which range from 0.2 to 2 um size has been disclosed in U.S. Pat. No. 5,316,570, May 31, 1994, which can be used for plastics and paints.

U.S. Pat. No. 5,275,649, Jan. 4, 1994, describes a process for the preparation of environment-friendly inorganic yellow pigments based on praseodymium zircons ($ZrSiO_4$:Pr), which can be applied to ceramics because of its thermal stability. However, this pigment requires high temperature calcination (~1300° C.).

Non-toxic yellow/orange pigment compositions well suited for the coloration of a wide variety of substrates, for example paints, varnishes, ceramics, etc. comprise a major amount of zirconium oxide and an additive amount of cerium, praseodymium and or terbium values in the form of oxides have been reported in the U.S. Pat. No. 5,560,772, Oct. 1, 1996. The calcinations are generally carried out under air atmosphere by heating at least to 1550° C.

Oxonitrides with a perovskite of the general formula $LnTaON_2$, where Ln is a rare-earth element, and which exhibit yellow-orange to reddish brown in color with an enhanced brightness, are produced in the presence of mineralizing agent from the series of alkali metal or alkaline earth halides, by annealing a powder mixture consisting of a Ta (V) compound and a Ln compound in a reducing atmosphere of ammonia (Reference may be made to U.S. Pat. No. 5,693,102, Dec. 2, 1997; M. Jansen and H. P. Letschert, Nature 2000, 404, 980-982). However, in the preparation of these perovskites, it is necessary to heat the starting material in the flow of toxic and inflammable ammonia gas for a long period (20-60 hrs.).

U.S. Pat. No. 6,419,735, Jul. 16, 2002, discloses a process for the preparation of samarium sesquisulfide pigment. The process consist of reacting samarium, trivalent rare earth metal, and alkali metal or alkaline earth metal compounds with a gaseous mixture of hydrogen sulfide and carbon disulfide. The compositions of the invention exhibit a strong yellow color.

U.S. Pat. No. 5,336,312, Aug. 9, 1995 describes a process relating to the yellow colorants represented by the formula $Bi_2A_{x-1}D_xO_y$, wherein: A is selected from group consisting of Bi, Ba, Sr, Ca, Y, La or a mixture of two or more thereof; D is selected consisting of V, Mo, Mn, Ti, Ta, Nb, W, Sb, Fe, Cr, Sn, Ce or mixture of two or more thereof; x is a number that is at least 1; y is the number of oxygens required to fulfill the valency of bismuth, A and D. The colorants are useful in providing colored compositions including: organic compositions, plastics, rubbers and inorganic compositions such as ceramics, enamels and coating compositions such as paints and printing inks. Prabhakar Rao and Reddy (Reference may be made to Dyes and Pigments, 2004, 63, 169-174) have reported yellow-orange colorants based on bismuth and rare earth oxides having the general formula $(Bi_2O_3)_{1-x}(RE_2O_3)_x$ where RE is Y or Ce with a nominal composition; x=0.2 or 0.5 for Y; x=0.3 or 0.5 for Ce.

Yellow inorganic pigments consisting of double molybdates of cerium and of an alkali metal, of general formula $CeM(MoO_4)_2$ in which M denotes an alkali metal, preferably sodium has been described in an European patent (Reference may be made to EP0542343, May 19, 1993).

Japanese patent JP2003160742 discloses a process for a yellow cerium pigment having a general formula: $AC_xLn_{1-x}Mo_2O_8$ wherein x ranges from 0 to 1; A in the composition is at least one element selected from the group consisting of Li, Na, K, Rb and Cs and Ln is at least one element selected from the group consisting of Y, La, Gd and Lu.

New yellow pigments without toxic metal to substitute the conventional CdS, $PbCrO_4$ and $Pb_2Sb_2O_7$, cerium thiosilicates have been reported (G. Gauthier, S. Jobic, M. Evain, H.-J. Koo, M.-H Whangbo, C. Fouassier, and R. Brec, Chem. Mater. 2003, 15, 828-837). However, there are still some problems in their synthesis processes. The heating conditions must be controlled exactly to synthesize the cerium thiosilicates and this method is too time consuming (minimum 13 days).

Although some alternative yellow pigments based on cerium oxide and other transition metal oxides have been reported, but their chromatic properties are not satisfactory for industrial use (further reference may be made to T. Masui, H. Tategaki, N. Imanaka, J. Mater. Sci. 2004, 39, 4909-4911; Imanaka et al. Chem. Lett. 2005, 34, 1322-1323; T. Masui, S. Furukawa, and N. Imanaka, Chem. Lett. 2006, 35, 1032-1033).

SUMMARY OF THE INVENTION

The main objective of the present invention is to provide a novel yellow inorganic pigment that comprises oxides of alkaline earth, praseodymium, and transition metals (Ti, Zr, Mo or a combination of these transition metals) having the general formula $APr_2MoTm_xO_{6+\eta}$ or $Pr_2MoTm_xO_{6+\eta}$ (Tm=Ti or Zr and x=0 or 1), wherein A is selected from one or more alkaline earth metals (A=for example, Mg, Ca, Sr or Ba, or combinations thereof), and wherein η has a value commensurate with the value of x and sufficient to satisfy the valencies of the formula.

Another objective of the present invention is to provide novel yellow inorganic pigments, which can be used to form color objects or coatings and can have applications in paints, plastics, glasses, ceramics and the like.

Yet another objective of the present invention is to provide toxic metal free alkaline earth, praseodymium, and transition metal oxide yellow pigments.

Accordingly, the present invention provides yellow inorganic pigments comprising praseodymium, molybdenum, oxides of another transition metal selected from, titanium, zirconium and combinations thereof, optionally with an alkaline earth metal (A) and the said yellow inorganic pigment obtained has a general formula $APr_2MoTm_xO_{6+\eta}$ or $Pr_2MoTm_xO_{6+\eta}$ (Tm=Ti or Zr and x=0 or 1) wherein A is selected from one or more alkaline earth metals [A=for example, Mg, Ca, Sr or Ba, or combinations thereof], and wherein η has a value commensurate with the value of x and sufficient to satisfy the valencies of the formula.

In an embodiment of the present invention, the alkaline earth metal (A) used is selected from the group consisting of Mg, Ca, Sr, Ba and combinations thereof.

In yet another embodiment, the yellow inorganic pigments comprise praseodymium, molybdenum and at least one alkaline earth metal oxide and having a general formula of $APr_2MoO_7$ wherein A=Mg, Ca, Sr or Ba, or combinations thereof.

In yet another embodiment, the yellow inorganic pigment of general formula $Pr_2MoO_6$ has chromaticity coordinates of L* (lightness)=80.3, a* (the axis red green)=−6.5, b* (the axis yellow blue)=64.6.

In yet another embodiment, the yellow inorganic pigment of formula $Pr_2MoTiO_8$, has chromaticity coordinates of L*=88.4, a*=−13.7, b*=43.1.

In yet another embodiment, the yellow inorganic pigment of formula $Pr_2MoZrO_8$, has chromaticity coordinates of L*=74.7, a*=−3.7, b*=54.6.

In yet another embodiment, the yellow inorganic pigment of formula $APr_2MoO_7$ has the following chromaticity coordinates as per the CIE 1976 colour scales:

$MgPr_2MoO_7$, L*=81.1, a*=−9.1, b*=53.5;

$CaPr_2MoO_7$, L*=78.7, a*=−5.6, b*=52.8;

$SrPr_2MoO_7$, L*=79.5, a*=−5.8, b=50.3;

$BaPr_2MoO_7$, L*=77.1, a*=−6.1, b*=49.3.

The present invention further provides a process for the preparation of yellow inorganic pigments of general formula $APr_2MoTm_xO_{6+\eta}$ or $Pr_2MoTm_xO_{6+\eta}$ (Tm=Ti or Zr and x=0 or 1) wherein A is selected from one or more alkaline earth metals [A=for example, Mg, Ca, Sr or Ba, or combinations thereof], and wherein η has a value commensurate with the value of x and sufficient to satisfy the valencies of the formula, the process comprising mixing the respective constituent oxides of metals in a stoichiometric ratio, followed by calcination at a temperature in the range of 900°-1100° C. in air atmosphere, for a period of about 6-9 hrs to obtain the desired product.

In yet another embodiment, the solid oxide of its alkaline earth metal used is selected from the group consisting of $MgCO_3$, $CaCO_3$, $SrCO_3$ and $BaCO_3$.

In yet another embodiment, the solid oxide of a transition metal is used and is selected from the group consisting of $TiO_2$, $ZrO_2$ and $(NH_4)_6Mo_7O_{24} \cdot 4H_2O$.

In yet another embodiment, the solid oxide of praseodymium used is $Pr_6O_{11}$.

In yet another embodiment, the yellow inorganic pigment obtained is represented by the following formulations:

i) $Pr_2MoO_6$;
ii) $Pr_2MoTiO_8$;
iii) $Pr_2MoZrO_8$;
iv) $MgPr_2MoO_7$;
v) $CaPr_2MoO_7$;
vi) $SrPr_2MoO_7$; and
vii) $BaPr_2MoO_7$.

The main advantage of the present invention is that it provides toxic metal free alkaline earth, praseodymium, and transition metal oxide yellow pigments.

Another advantage is that it provides toxic metal free yellow pigments with better chromatic properties for industrial application.

DETAILED DESCRIPTION OF THE INVENTION

It is an object of the present invention to provide non-toxic yellow pigments having the formula, $APr_2MoTm_xO_{6+\eta}$ or $Pr_2MoTm_xO_{6+\eta}$ (Tm=Ti or Zr and x=0 or 1) wherein A is selected from one or more alkaline earth metals [A=for example, Mg, Ca, Sr or Ba, or combinations thereof], and wherein $\eta$ has a value commensurate with the value of x and sufficient to satisfy the valencies of the formula, for applications in paints, plastics, glasses, ceramics, and the like. High purity chemicals such as $MgCO_3$, $CaCO_3$, $SrCO_3$, $BaCO_3$, $TiO_2$, $ZrO_2$, $(NH_4)_6Mo_7O_{24} \cdot 4H_2O$ and $Pr_6O_{11}$ are weighted in the stoichiometric ratio, ball milled and calcined in the range 900°-1200° C. for 3-12 hrs in air. The well ground calcined powders were used for characterization of the pigments. The phase purity and optical properties of the prepared pigments were investigated.

The following examples are given by the way of illustration and therefore should not be construed to limit the scope of the invention.

EXAMPLES

Example 1

Preparation of $Pr_2MoO_6$ Yellow Pigment

Figure 1:
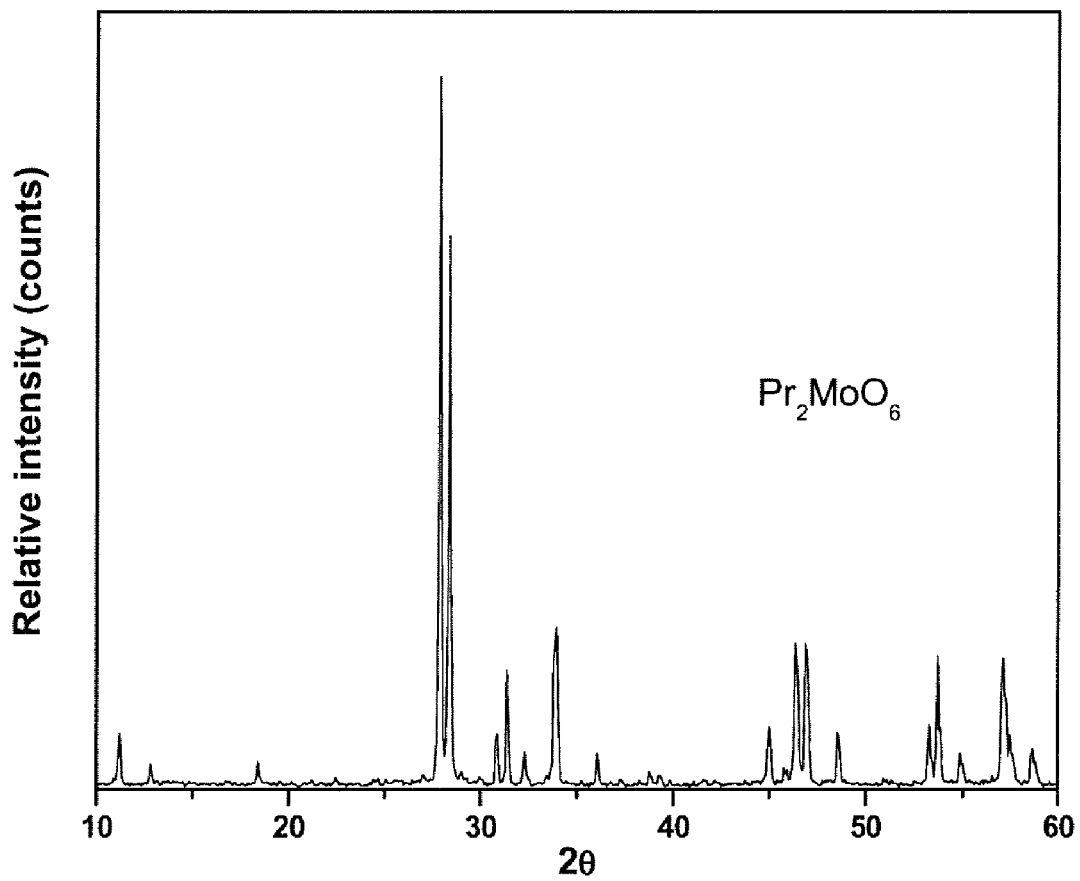
FIG. 1: Powder X-ray diffraction pattern of $Pr_2MoO_6$.
Figure 2:
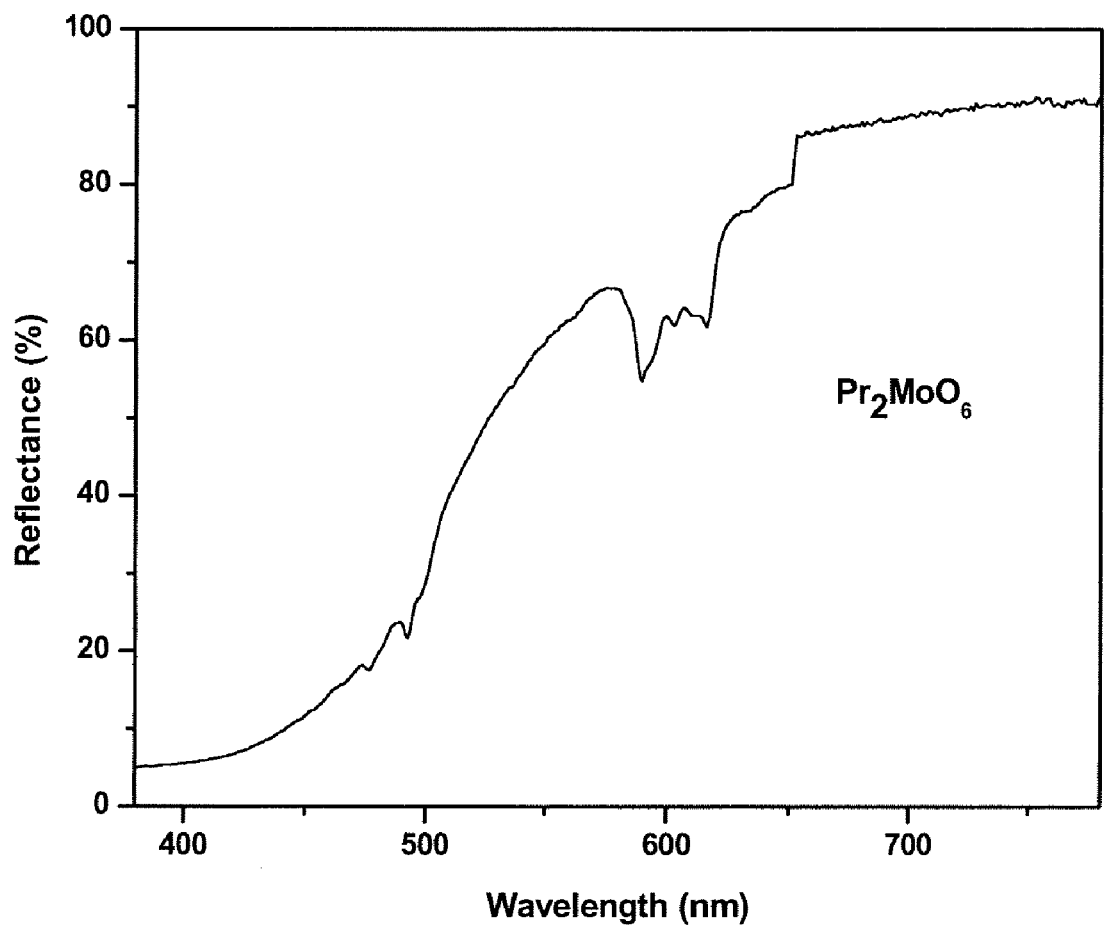
FIG. 2: Diffuse reflectance spectra of $Pr_2MoO_6$.

This example relates to the preparation of $Pr_2MoO_6$ pigment. $Pr_6O_{11}$ (purity 99.9%) and $(NH_4)_6Mo_7O_{24} \cdot 4H_2O$ (purity 99.9%) were thoroughly mixed in the stoichiometric ratio in agate mortar with a pestle. The mixture was calcined at 1050° C. for 9 h in air. The obtained powders were examined by means of X-ray powder diffraction (XRD) using Ni filtered CuKα1 radiation with a Philips X'pert Pro diffractometer. XRD pattern of the compound depicted in FIG. 1 is in good agreement with the powder X-ray diffraction file: PDF no. 24-913. Morphological analysis was performed by means of scanning electron microscope with a JEOL JSM-5600LV SEM. The particle size of the pigment varies in the range 1-2 μm. Optical reflectances of the powders was measured with UV-Vis spectrophotometer (Shimadzu, UV-2450) using barium sulfate as a reference is shown FIG. 2. The chromaticity coordinates, determined by the CIE-LAB 1976 color scales are L*=80.3, a*=−6.5, b*=64.6. The values a* (the axis red-green) and b* (the axis yellow-blue) indicate the color hue. The value L* represents the lightness or darkness of the color as related to a neutral grey scale.

Example 2

Preparation of $Pr_2MoTmO_8$ (Tm=Ti or Zr) Yellow Pigments

Figure 3:
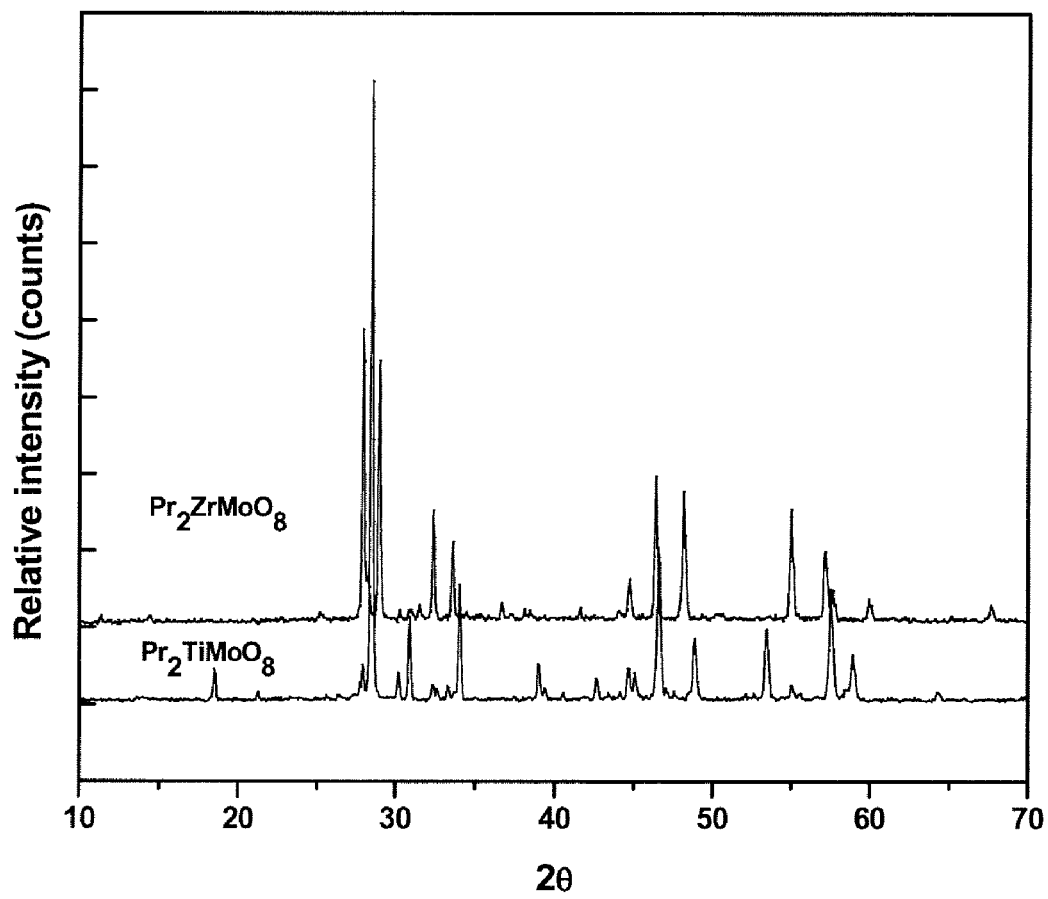
FIG. 3: Powder X-ray diffraction patterns of $Pr_2TmMoO_8$ (Tm=Ti or Zr).
Figure 4:
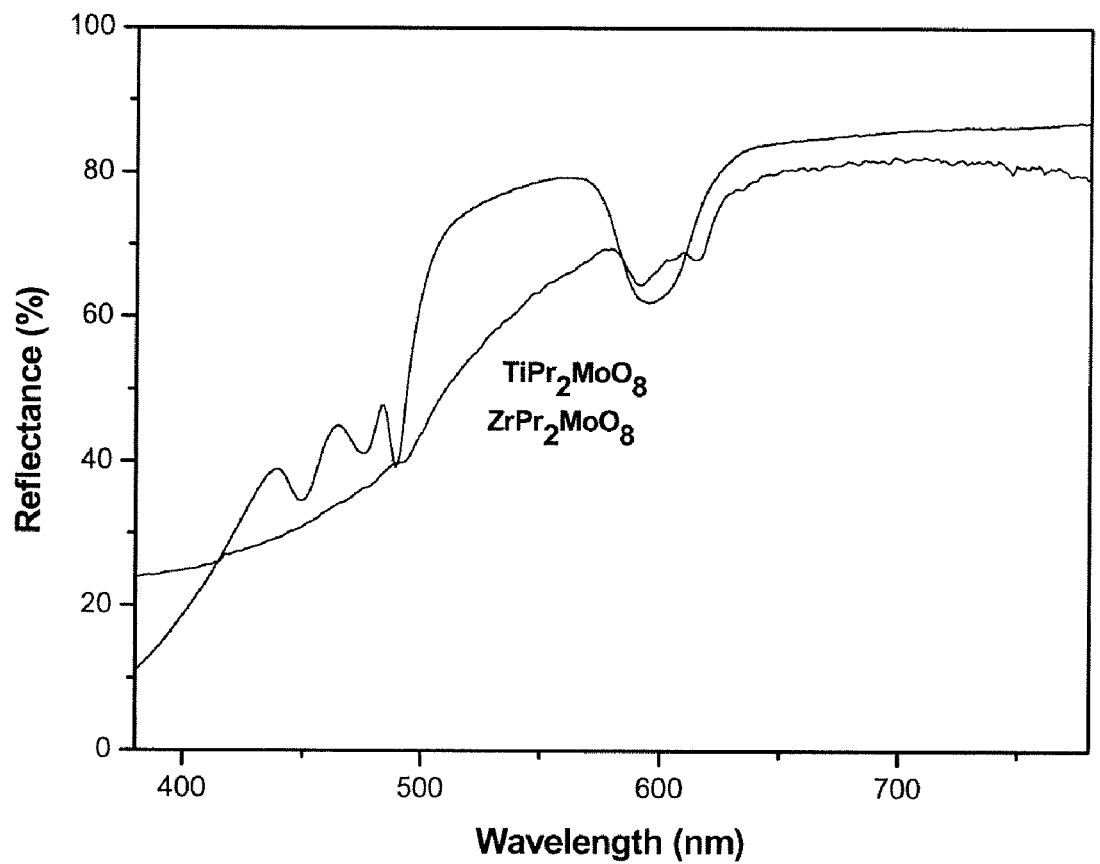
FIG. 4: Diffuse reflectance spectra of $Pr_2TmMoO_8$ (Tm=Ti or Zr).

This example describes the synthesis of $Pr_2MoTmO_8$ (Tm=Ti or Zr). $TiO_2$ (purity 99.9%), $ZrO_2$ (purity 99.9%), $Pr_6O_{11}$ (purity 99.9%) and $(NH_4)_6Mo_7O_{24} \cdot 4H_2O$ purity 99.9%) were thoroughly mixed in the stoichiometric ratio in agate mortar with a pestle. The mixture was calcined at 1100° C. for 9 h in air. The obtained powders were examined by means of X-ray powder diffraction (XRD) using Ni filtered CuKα1 radiation with a Philips X'pert Pro diffractometer. XRD pattern of the compound depicted in FIG. 3 is in good agreement with the powder X-ray diffraction file: PDF no. 49-0601. Morphological analysis was performed by means of scanning electron microscope with a JEOL JSM-5600LV SEM. The particle size of the pigment powders was found to vary in the range 1-5 μm. Optical reflectance of the powder was measured with UV-Vis spectrophotometer (Shimadzu, UV-2450) using barium sulphate as a reference is shown FIG. 4. The chromaticity coordinates, determined by the CIE-LAB 1976 color scales are as follows:

$Pr_2MoTiO_8$, L*=88.4, a*=−13.7, b*=43.1.

$Pr_2MoZrO_8$, L*=74.7, a*=−3.7, b*=54.6.

Example 3

Preparation of $APr_2MoO_7$ (A=Mg, Ca, Sr or Ba) Yellow Pigments

Figure 5:
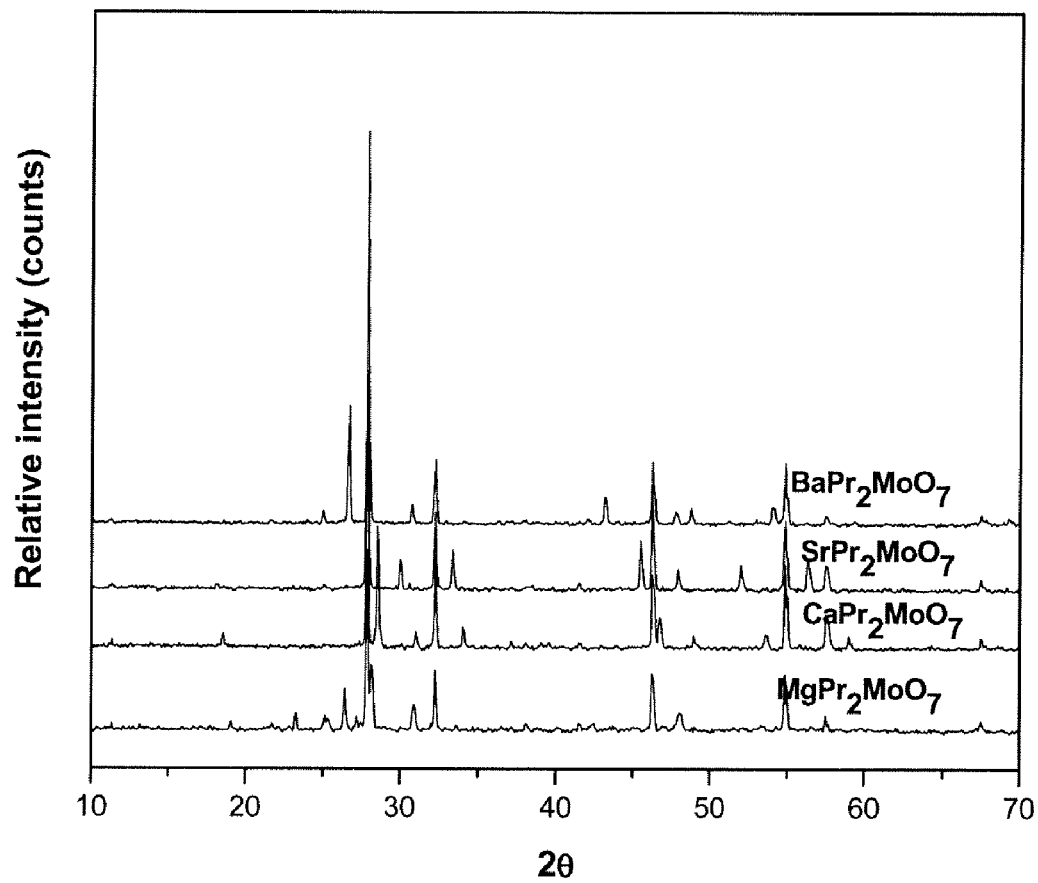
FIG. 5: Powder X-ray diffraction patterns of $APr_2MoO_7$ (A=Mg, Ca, Sr, or Ba) pigments.
Figure 6:
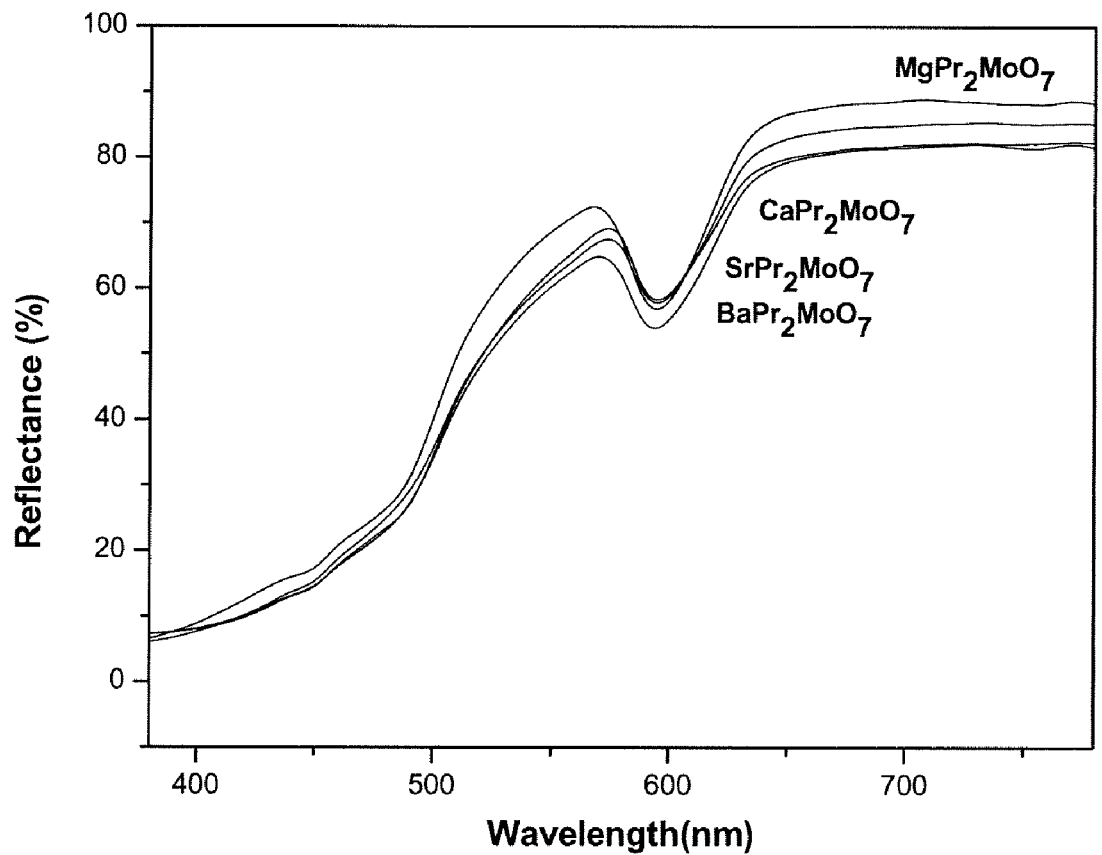
FIG. 6: Reflectance spectra of $APr_2MoO_7$ (A=Mg, Ca, Sr, or Ba) pigments.

This example relates to the synthesis of $APr_2MoO_7$ (A=Mg, Ca, Sr or Ba). $MgCO_3$ (purity 99.9%), $CaCO_3$ (purity 99.9%), $SrCO_3$ (purity 99.9%), $BaCO_3$ (purity 99.9%), $Pr_6O_{11}$ (99.9%) and $(NH_4)_6Mo_7O_{24} \cdot 4H_2O$ (99.9%) were thoroughly mixed in the stoichiometric ratio in agate mortar with a pestle. The mixture was calcined at 950° C. for 6 h in air. The obtained powders were examined by means of X-ray powder diffraction (XRD) using Ni filtered CuKα1 radiation with a Philips X'pert Pro diffractometer. XRD pattern of the compound depicted in FIG. 5. The XRD patterns can be indexed to fergusonite related phases. Morphological analysis was performed by means of scanning electron microscope with a JEOL JSM-5600LV SEM. The particle size of the pigment varies in the range 1-5 um. Optical reflectance of the powder was measured with UV-Vis spectrophotometer (Shimadzu, UV-2450) using barium sulfate as a reference is shown FIG. 6. The chromaticity coordinates, determined by the CIE-LAB 1976 color scales are:

$MgPr_2MoO_7$, L*=81.1, a*=−9.1, b*=53.5;

$CaPr_2MoO_7$, L*=78.7, a*=−5.6, b=52.8;

$SrPr_2MoO_7$, L*=79.5, a*=−5.8, b*=50.3;

$BaPr_2MoO_7$, L*=77.1, a*=−6.1, b*=49.3.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A yellow inorganic pigment comprising praseodymium, molybdenum, oxides of another transition metal selected from, titanium, zirconium and combinations thereof, wherein said yellow inorganic pigment obtained has a general formula $APr_2MoTm_xO_{6+\eta}$ or $Pr_2MoTmO_{6+\eta}$, wherein Tm is Ti or Zr, x is 0 or 1, and A is an alkaline earth metal, and wherein $\eta$ is sufficient to satisfy the valencies of the formula.

2. The yellow pigment according to claim 1, wherein the alkaline earth metal (A) used is selected from the group consisting of Mg, Ca, Sr, Ba and combinations thereof.

3. The yellow pigment according to claim 1, said pigment comprising praseodymium, molybdenum and at least one alkaline earth metal oxide and having a general formula of $APr_2MoO_7$, wherein A=Mg, Ca, Sr or Ba.

4. The yellow pigment according to claim 1, said pigment having the formula $Pr_2MoTiO_8$ and chromaticity coordinates of L*=88.4, a*=−13.7, b*=43.1.

5. The yellow pigment according to claim 1, said pigment having the formula $Pr_2MoZrO_8$ and chromaticity coordinates of L*=74.7, a*=−3.7, b*=54.6.

6. The yellow pigment according to claim 1, said pigment having the formula $APr_2MoO_7$ and the following chromaticity coordinates as per the CIE 1976 colour scales:

$MgPr_2MoO_7$, L*=81.1, a*=−9.1, b*=53.5;

$CaPr_2MoO_7$, L*=78.7, a*=−5.6, b*=52.8;

$SrPr_2MoO_7$, L*=79.5, a*=−5.8, b*=50.3; and $BaPr_2MoO_7$, L*=77.1, a*=−6.1, b*=49.3.

7. A yellow inorganic pigment comprising praseodymium, molybdenum, oxides of another transition metal selected from, titanium, zirconium and combinations thereof, wherein said yellow inorganic pigment obtained has a general formula $APr_2MoTm_xO_{6+\eta}$ or $Pr_2MoTmO_{6+\eta}$, wherein Tm is Ti or Zr, x is 0 or 1, A is an alkaline earth metal, and the pigment has a particle size in the range of 1-5 μm, wherein η has a value that is sufficient to satisfy the valencies of the formula.

8. The yellow pigment according to claim 7, wherein the alkaline earth metal (A) used is selected from the group consisting of Mg, Ca, Sr, Ba and combinations thereof.

9. The yellow pigment according to claim 7, said pigment comprising praseodymium, molybdenum and at least one alkaline earth metal oxide and having a general formula of $APr_2MoO_7$, wherein A=Mg, Ca, Sr or Ba.

10. The yellow pigment according to claim 7, said pigment having the formula $Pr_2MoTiO_8$ and chromaticity coordinates of L*=88.4, a*=−13.7, b*=43.1.

11. The yellow pigment according to claim 7, said pigment having the formula $Pr_2MoZrO_8$ and chromaticity coordinates of L*=74.7, a*=−3.7, b*=54.6.

12. The yellow pigment according to claim 7, said pigment having the formula $APr_2MoO_7$ and the following chromaticity coordinates as per the CIE 1976 colour scales:

$MgPr_2MoO_7$, L*=81.1, a*=−9.1, b*=53.5;

$CaPr_2MoO_7$, L*=78.7, a*=−5.6, b*=52.8;

$SrPr_2MoO_7$, L*=79.5, a*=−5.8, b*=50.3; and $BaPr_2MoO_7$, L*=77.1, a*=−6.1, b*=49.3.

13. A process for the preparation of a yellow inorganic pigment having the general formula $APr_2MoTm_xO_{6+\eta}$ or $Pr_2MoTm_xO_{6+\eta}$ wherein Tm=Ti or Zr, x=0 or 1, A is selected from Mg, Ca, Sr, Ba and combinations thereof, and wherein η has a value commensurate with the value of x and sufficient to satisfy the valencies of the formula, said process comprising mixing the solid respective constituent oxides of metals in a stoichiometric ratio, calcinating at a temperature in the range of 900°-1100° C. in air atmosphere for a period of about 6-9 hrs to obtain the desired product.

14. The process according to claim 13, wherein the solid oxide of alkaline earth metal used is selected from the group consisting of $MgCO_3$, $CaCO_3$, $SrCO_3$ and $BaCO_3$.

15. The process according to claim 13, wherein the solid oxide of transition metal used is selected from the group consisting of $TiO_2$, $ZrO_2$ and $(NH_4)_6Mo_7O_{24} \cdot 4H_2O$.

16. The process according to claim 13, wherein the solid oxide of praseodymium used is $Pr_6O_{11}$.

17. The process according to claim 13, wherein the yellow inorganic pigment obtained is represented by the following formulations:
i) $Pr_2MoTiO_8$;
ii) $Pr_2MoZrO_8$;
iii) $MgPr_2MoO_7$;
iv) $CaPr_2MoO_7$;
v) $SrPr_2MoO_7$; and
vi) $BaPr_2MoO_7$.

18. The process according to claim 13, wherein the yellow pigment of formula $Pr_2MoTiO_8$ obtained has chromaticity coordinates of L*=88.4, a*=−13.7, b*=43.1.

19. The process according to claim 13, wherein the yellow pigment of formula $Pr_2MoZrO_8$, has chromaticity coordinates of L*=74.7, a*=−3.7, b*=54.6.

20. The process according to claim 13, wherein the yellow pigment of formula $APr_2MoO_7$ has the following chromaticity coordinates as per the CIE 1976 colour scales:

$MgPr_2MoO_7$, L*=81.1, a*=−9.1, b*=53.5;

$CaPr_2MoO_7$, L*=78.7, a*=−5.6, b*=52.8;

$SrPr_2MoO_7$, L*=79.5, a*=−5.8, b*=50.3;

$BaPr_2MoO_7$, L*=77.1, a*=−6.1, b*=49.3.

* * * * *